Feb. 9, 1971

W. L. KIBLER 3,562,073

APPARATUS FOR FRICTION WELDING A PAIR OF PLASTIC
MEMBERS IN A PREDETERMINED ANGULAR RELATION

Filed Jan. 8, 1968

INVENTOR
WILLIS L. KIBLER
BY
ATTORNEY

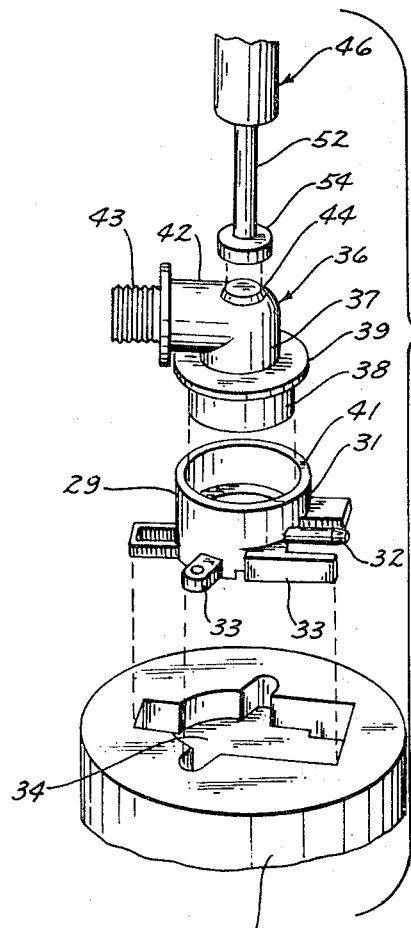
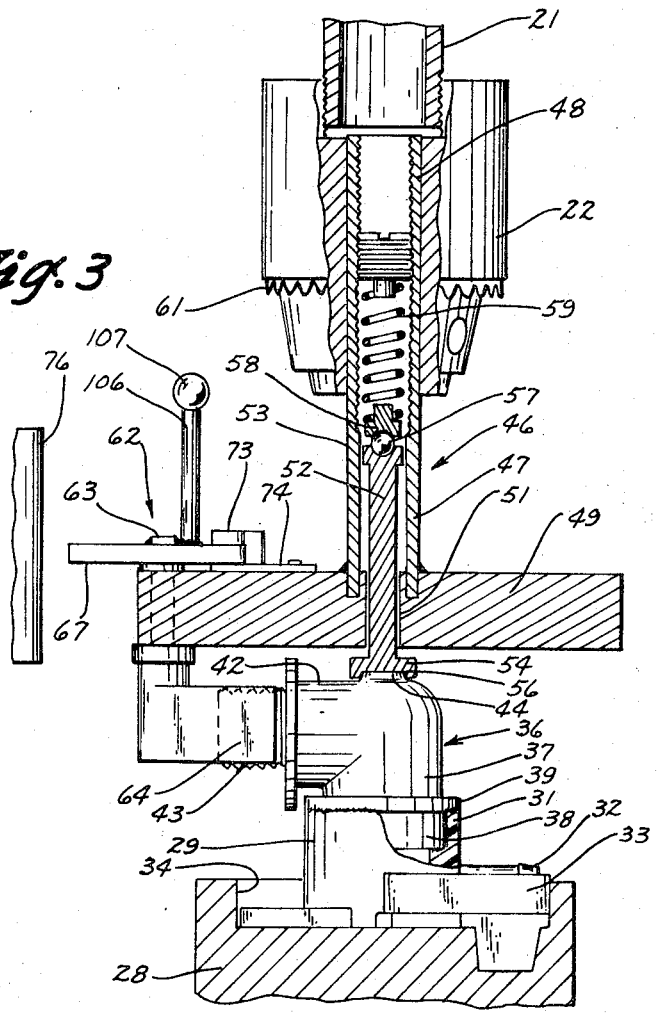
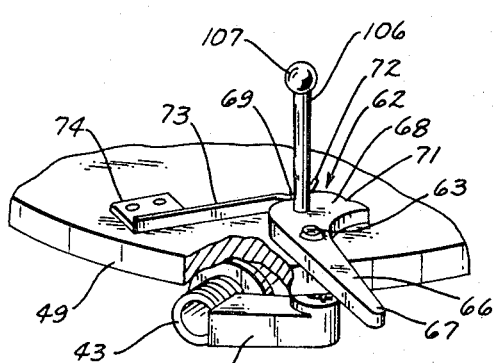
Fig. 3
Fig. 4
Fig. 5
INVENTOR
WILLIS L. KIBLER
ATTORNEY Feb. 9, 1971 W. L. KIBLER 3,562,073
APPARATUS FOR FRICTION WELDING A PAIR OF PLASTIC
MEMBERS IN A PREDETERMINED ANGULAR RELATION
Filed Jan. 8, 1968 3 Sheets-Sheet 3

INVENTOR
WILLIS L. KIBLER
BY
*Rudolph P. Rowell*
ATTORNEY

_United States Patent Office_

3,562,073
Patented Feb. 9, 1971

3,562,073
APPARATUS FOR FRICTION WELDING A PAIR OF PLASTIC MEMBERS IN A PREDETERMINED ANGULAR RELATION
Willis L. Kibler, Detroit, Mich., assignor, by mesne assignments, to McCord Corporation, Detroit, Mich., a corporation of Maine
Filed Jan. 8, 1968, Ser. No. 696,447
Int. Cl. B29c 27/08; B23k 1/06
U.S. Cl. 156—580     5 Claims

ABSTRACT OF THE DISCLOSURE

The spin welding machine includes a supporting table disposed below an axially movable and rotatable clutch mechanism that includes an annular plate member for pivotally supporting an elbow engaging pawl and a trip lever therefor. A spring pressed centering member rotatably carried on the plate support projects axially downwardly from the plate support. A plastic housing member having an annular portion for connection with one end of a plastic elbow fitting is held against rotation in a table mounted fixture with the annular portion faced upwardly in coaxial alignment with the plate support. With one end of the fitting received in the annular portion the other fitting end is extended radially of the annular portion. On downward movement of the support plate to a limited position the centering member engages the fitting to maintain a pressure contact of the fitting with the housing annular portion. On lowering of the plate member to an adjusted position for rotation the pawl releasably engages the radially extended end of the fitting and rotates the fitting relative to the housing annular portion. This rotation is continued for a predetermined time period that is terminated with the engagement of the pawl trip lever by a solenoid operated actuating member carried on the table. The actuating member is oriented relative to the housing member so that pawl disengagement from the elbow fitting takes place when the radially extended end portion of the elbow is in a predetermined rotated position relative to the annular portion of the housing member. The plate member is then raised, the spin welded assembly of the elbow and housing member removed from the fixture, and the pawl is automatically reset for the next spin welding operation.

SUMMARY OF THE INVENTION

The spin welding machine and method of this invention provides for the spin welding of an elbow fitting with the housing of a pump or the like concurrently with automatically locating the elbow in a predetermined rotated position relative to the housing. The resultant housing and elbow assemblies are of a unit one piece construction and economically produced in conformance with predetermined specification requirements. Manual threading together of the elbow fitting and housing and resultant time and inconvenience encountered in rotating the elbow to a final specified assembly position are completely eliminated.

DETAILED DESCRIPTION OF THE INVENTION

Further objects, features and advantages of the invention will become apparent from the following description when taken in connection with the accompanying drawings, wherein:

FIG. 3 is an exploded perspective view of a housing and elbow fitting that are to be spin welded together, showing their arrangement relative to a pressure maintaining means and housing holding fixture that form part of the spin welding machine;

FIG. 4 is an enlarged sectional detail view as seen along the line 4—4 in FIG. 2;

FIG. 5 is a detail perspective view showing a clutch mechanism for releasably engaging and rotating the elbow relative to the housing;

Figures 1, 2:
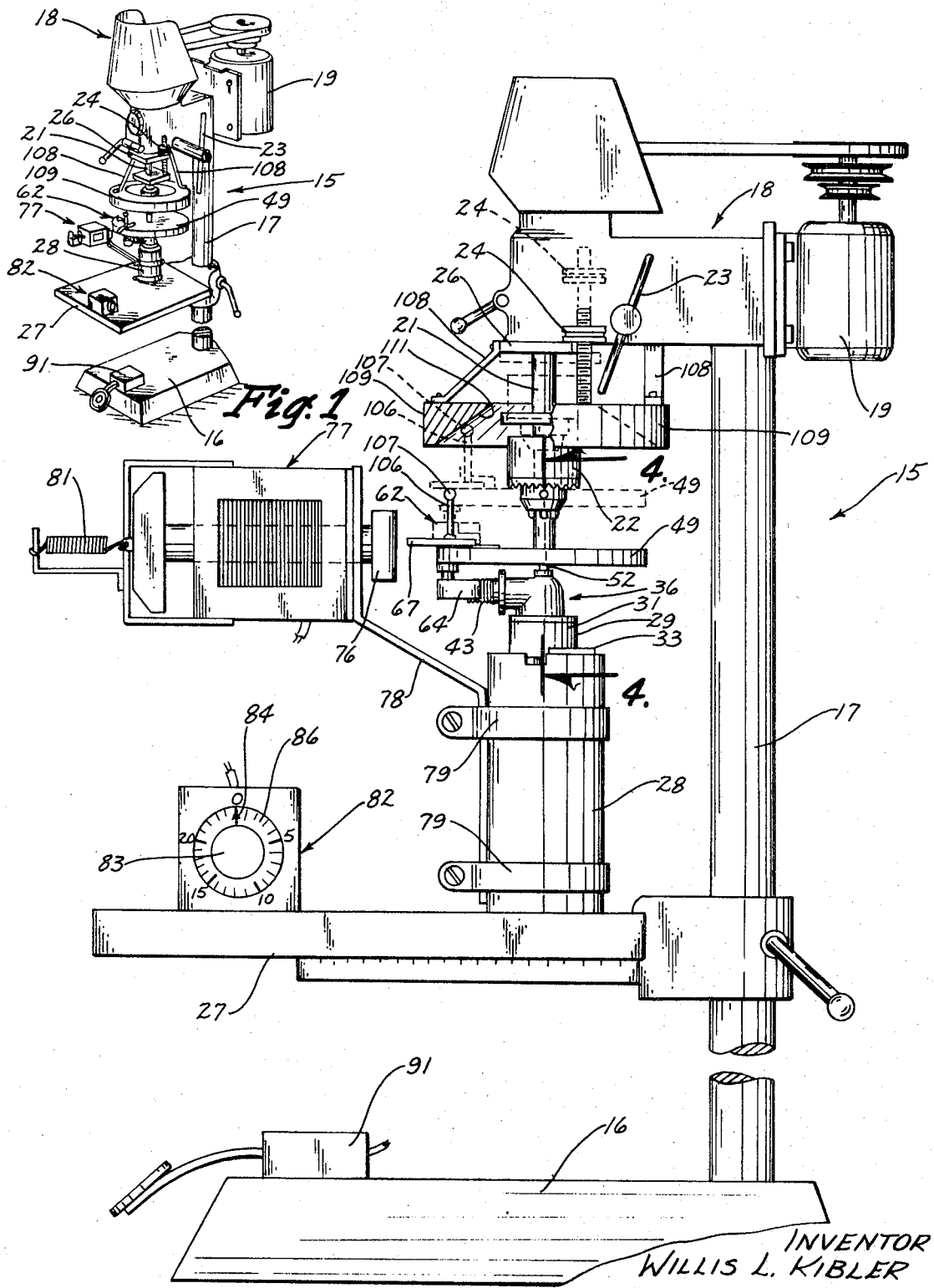
FIG. 1 is a perspective view of the spin welding machine of this invention.
FIG. 2 is an enlarged foreshortened side elevational view of the machine.

Referring to FIG. 1 of the drawings the spin welding machine of this invention, indicated generally at 15, is illustrated as including a manually operated drill press of a well-known type having a base stand 16 and a column support 17 for a head assembly 18. The head assembly has an electric motor 19 in operative driving relation with an upright axially movable and rotatable shaft 21, the lower end of which carries a chuck member 22. Axial movement of the chuck member is accomplished by manipulation of a hand lever 23. In a manner, well known, downward movement of the chuck member 22 is limited by the abutting engagement of an adjustable stop means or nut 24 with a stop member 26 on the head assembly 18.

As shown in FIG. 2 a horizontal table or support frame 27, located below the chuck member 22, is adjustably mounted for vertical movement on the column 17. Carried on the table 27 is a fixture 28 for receiving a housing member 29, illustrated as a pump housing 29 having an annular portion 31 (FIG. 3), a discharge outlet 32 and laterally extended projections 33 for assembly with a drive motor (not shown). The upper surface of the fixture 28 has a recess 34 the side wall of which is of a configuration to conform to the plan configuration of the housing 29 so as to receive in mating engagement the lateral projections 33 with the annular portion 31 faced upwardly. The housing 31 is thus held against rotation with the annular portion 31 coaxial with and in a predetermined rotated position relative to the shaft 21 for a purpose to appear later.

An elbow fitting 36 (FIG. 3) constituting an inlet connection for the housing 29 has one leg section 37 formed at its free end with an annular portion 38 that is telescopically receivable within the annular portion 31 of the housing. This telescopic relation is limited by the engagement of an annular radially extended collar 39, formed on the fitting adjacent the base or inner end of the annular portion 38, with the rim 41 of the annular portion 31 of the housing 29. With the fitting leg section 37 thus received in the housing annular portion 31 the other leg section 42 of the elbow fitting extends radially outwardly from both of the annular portions 31 and 38. As illustrated the leg section 42 terminates in an externally threaded portion 43 for threaded engagement with a fluid reservoir or the like (not shown). Also, and as best appears in FIGS. 3 and 4, the outer surface of the junction of the leg sections 37 and 42 is formed with an annular boss 44 that is in coaxial alignment with the annular portion 38 of the leg section 37.

Secured in the chuck member 22 (FIG. 4) is a pressure applying unit 46 which, on lowering of the chuck member to a position limited by abutment of the stop nut 24 with the stop member 26, engages the fitting 36 to maintain a pressure contact between the collar 39 on the elbow leg section 37 and the rim 41 of the housing annular portion 31. The unit 46 includes a tubular stem or body member 47 having an upper end section 48 gripped within the chuck member 22 and a lower end in welded securement with the upper surface of an annular plate support 49. A hole 51 is formed through the plate 49 coaxial with the tubular member 47 and in turn with the shaft 21.

Mounted within the sleeve 47 (FIG. 4) for axial and free rotational movement relative thereto is a spring pressed contact member or plunger 52, the lower end of which projects through the opening 51 in the support plate 49. The plunger 52 is of a general elongated spool shape having upper and lower annular flanges 53 and 54, respectively. The lower flange 54 has an annular recess 56 in its bottom surface for centering engagement with the annular boss 44 on the elbow fitting 36. Welded within the top surface of the upper flange 53 is a ball bearing 57 that projects upwardly into bearing engagement with the side wall of a concave recess formed in a spring centering or end cap 58.

A coil spring 59, carried within the sleeve 47, is maintained under compression between the end cap 58 and an adjustable spring centering plug 61 threadable within the upper end section 48 of the sleeve 47. The spring 59 exerts a yieldable pressure that acts to move the plunger 52 downwardly through the plate opening 51. The upper flange 53 is engageable with the plate 49 about the opening 51 to hold the plunger from dropping through the plate.

As thus far described it is seen that on lowering of the chuck member 22 the plunger 52 is moved into engagement with the elbow fitting 36 against the pressure of the spring 59 to provide a contact pressure between the collar 39 on the fitting 36 and the rim 41 on the annular portion 41 of the housing 29. This pressure contact may be varied by adjustment of the end plug 61 relative to the adjustment of the chuck member 22 to a lowered position as established by the engagement of the adjustable nut the 24 with stop member 26. In turn this pressure contact is correlated with a predetermined period of time of rotation of the fitting 36 relative to the housing 29 to provide for a spin welded connection therebetween.

This period of rotation is accomplished by what will be referred to as a clutch mechanism, indicated generally as 62 (FIGS. 4 and 5), carriedon the plate support 49 and operable into and out of a driving engagement with the elbow fitting 36. The clutch mechanism 62 includes the plate support 49 and a rod or shaft 63 extended through and rotatably mounted on the support plate 49 for rotation about an axis parallel to the rotation of the shaft 21. As shown in FIG. 4 the tubular stem 47 constitutes a mounting sleeve or bit by which the clutch mechanism 62 is supported in the chuck 22. Fixed to the lower end of the shaft 63 and below the support plate 49 is a pawl 64, which during rotation of the plate member 49, is pivotally movable into and out of an engageable position with the threaded portion 43 of the elbow fitting 36. A trip lever 66 for pivotally moving the pawl 64 is fixed to the upper end of the shaft 63 in a position above the support plate 49. The pawl 64 and lever 66 are thus pivotally movable together as a unit with the shaft 63.

The shaft 63 (FIGS. 6 and 7) is located adjacent to the periphery of the support plate 49 with the pawl 64 and lever 66 projected radially in opposite directions from the shaft. The lever 66 is secured intermediate its ends on the shaft 63 so as to have a finger end section 67 projected outwardly from the periphery of the plate and a cam end section 68 overlying the plate 49. The cam section 68 is formed with a pair of low portions or recesses 69 and 71 for releasably receiving one end 72 of a flat holding spring 73, the other end 74 of which is secured to the top surface of the plate 49.

When the spring end 72 is within the cam recess 69 (FIG. 6) the pawl 64, during rotation of the plate 49, is in a position to engage in a driving relation the threaded section 43 of the elbow fitting 36. In this position of the pawl the lever finger section 67 is projected to its outermost extended position relative to the plate 49 so as to be engageable, during rotation of the plate, with an actuating member 76 that is reciprocally movable radially of the plate 49. With the spring end 74 (FIG. 7) in the cam recess 71 the pawl 64 is not engageable with the fitting section 43 and the lever finger section 67 is in its innermost extended position relative to the plate 49, or in a rest or inoperative position relative to the actuating member 76.

The actuating member 76 (FIG. 2) comprises the plunger of a solenoid unit 77 that is located to one side of the plate 49 and carried on a bracket 78 which is adjustably secured to the housing holding fixture 28 by ring clamps 79. On loosening of the clamps 79 the actuating member 76 is vertically and circumferentially adjustable relative to the shaft 21, and in turn to the annular portions 31 and 38 of the housing 29 and fitting 36, respectively. This adjustment of the actuating member 76 is made relative to the fixed position of the housing 29 within the fixture 28 so that the member 76 is movable radially toward the plate 49 and into the rotating path of movement of the fully extended lever finger section 67 when the fitting end section 42 is in a predetermined radially extended or assembled position relative to the housing annular portion 31. The actuating member 76 is moved or extended toward the plate 49 on energization of the solenoid unit 77 and is retracted away from the plate by a return spring 81.

Operation of the solenoid unit 77 takes place following a predetermined time period of rotation of the elbow 36 relative to the housing 29. This time period is controlled by a timer unit 82 (FIG. 2) mounted on the table 27. The timer unit 82 is of a well-known type having a knob 83 with an indicator 84 manually movable relative to time setting indicia 86. Concurrently with the time setting, a clock mechanism and switch assembly (not shown) and forming a part of the timer unit 82 is set into operation to concurrently commence the time period and condition a control circuit for operating the motor 19 and solenoid unit 77.

Figure 8:
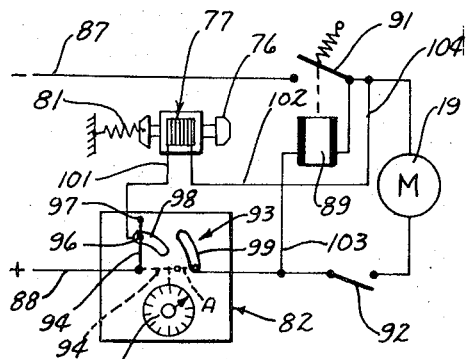
FIG. 8 is a diagrammatic showing the electrical control system for the machine.

Referring to FIG. 8 this circuit is illustrated as including lead lines 87 and 88 connected to a suitable source of electrical supply. The motor 19 for rotating the shaft 21, and in turn the clutch mechanism 62, is connected across the lead lines 87 and 88 in parallel with a holding relay 89 for a manually closeable motor switch 91 that is connected in the lead line 87. A master switch 92 and a switch assembly 93 of the timer unit 82 are series connected in the lead line 88. The switch assembly 93 has a clock actuated switch member 94 with a pair of spaced contacts 96 and 97 corresponding to segmental terminals 98 and 99, respectively, that are concentrically arranged with inner adjacent ends in an overlapping spaced relation. The solenoid unit 77 has one side connected to the terminal 98 through a line 101 and its other side connected by a line 102 to the lead line 87 at a position between the motor 19 and the manually closeable switch 91. The holding relay 89 for the switch 91 is connected to the lead line 88 between the master switch 92 and switch assembly 93 by a line 103, and to the lead line 87 between the switch 91 and motor 19 by a line 104.

In the operation of the spin welding machine 15 assume that its parts are in the relative positions shown in full lines in FIG. 2 wherein the shaft 21 is in its lowered position as set by the adjusting nut 24, the housing 29 and elbow fitting 36 are held in pressure contact engagement by the plunger 52, the actuating member 76 is retracted, and the pawl 64 is in an elbow engaging position. To initiate the spin weld operation the master switch 92 (FIG. 8) is closed and the timer unit 82 is manually operated to a predetermined time setting.

In the setting of the timer unit 82 the switch member 94 is moved from its normal rest or stop position, shown in full lines in FIG. 8, to its dotted line operating position indicated at A in the same figure. As the switch member contact 96 moves over the segmental terminal 98 no current flows through the solenoid unit 77 because of the open switch 91. When the switch member contact 97 engages the segmental terminal 99 no current flows through the holding relay 89 or motor 19, also because of the open switch 91. However, on closing of the motor switch 91, which may be of a foot-operated type and mounted on base 16 of the machine 15, the circuits for the motor 19 and holding relay 89 are closed so as to start the time period of the spin weld. The circuit of the solenoid unit 77 remains open by virtue of the contact 96 being out of engagement with the segmental terminal 98.

On expiration of the time period as set by the timer unit 82 for the spin weld operation, the switch member 94 is moved from its dotted line position A to its full line position (FIG. 8). During this movement the motor switch 91 is held closed by the holding relay 89 to continue the motor 19 in operation for so long as the contact 97 is in engagement with the segmental terminal 99. By virtue of the overlapping relation of the adjacent inner ends of the terminals 98 and 99, the solenoid unit 77, on engagement of the contact 96 with the terminal 98, is momentarily energized to extend the actuating member 76. The motor 19 and the solenoid unit 77 are thus concurrently energized while the contacts 96 and 97 are engaged with their respective terminals 98 and 99, and are concurrently deenergized when the contact 97 moves off of the terminal 99 to open the circuit of the holding relay 89. On energization of the solenoid unit 77 the actuating member 76 is extended to disengage the pawl 64 from the elbow fitting 36. The time period of the spin welding operation is thus completed concurrently with an automatic predetermined locating of the fitting leg section 42 relative to the housing 29.

It is seen, therefore, that for a momentary period of time the motor 19 and the solenoid unit 77 are concurrently energized, and that the motor operation continues momentarily following such energization of the solenoid unit. Also, it is to be noted that the solenoid unit 77 and motor 19 are simultaneously deenergized after the spin welding operation has been completed and the leg section 42 of the elbow 36 rotated into a predetermined assembly position relative to the housing 29. The continued operation of the motor 19, after operation of the actuating member 76, and the usual overrun of the motor 19 after it has been shut off, is without any effect on such predetermined locating of the elbow leg 42, since the position of radial extension of the leg 42 from the housing 29 is predicated on the orientation of the actuating member 76 relative to the fixed position of the housing 29 in the fixture 28. The time period of rotation of the elbow 36 relative to the housing 29 starts with the closing of the switch 29 and ends when the solenoid unit 77 is energized.

On raising of the shaft 21 to move the clutch mechanism 62 to its dotted line position shown in FIG. 2 the assembly of the housing 29 and elbow 36 is readily removed from the fixture 28. The clutch mechanism 62 on raising of the shaft 21 is automatically reset for a next spin welding operation by means including an upright reset pin 106 (FIGS. 2 and 5) secured to the top side of the cam section 68 adjacent the recess 69 and having a plastic ball 107 secured to its top end. Supported on brackets 108 (FIG. 2) from the head assembly 18 is a cam ring 109 that is arranged in a concentrically spaced relation about the shaft 21. The inner peripheral surface 111 of the ring 109 is sloped upwardly and inwardly toward the shaft 21.

As best shown in FIG. 2 on upward movement of the clutch mechanism 62 toward its upper dotted line position the ball 107 engages the inclined ring surface 111 and the reset pin 106 is moved inwardly of the ring 109 as the ball travels upwardly along the surface 111.

Figure 6:
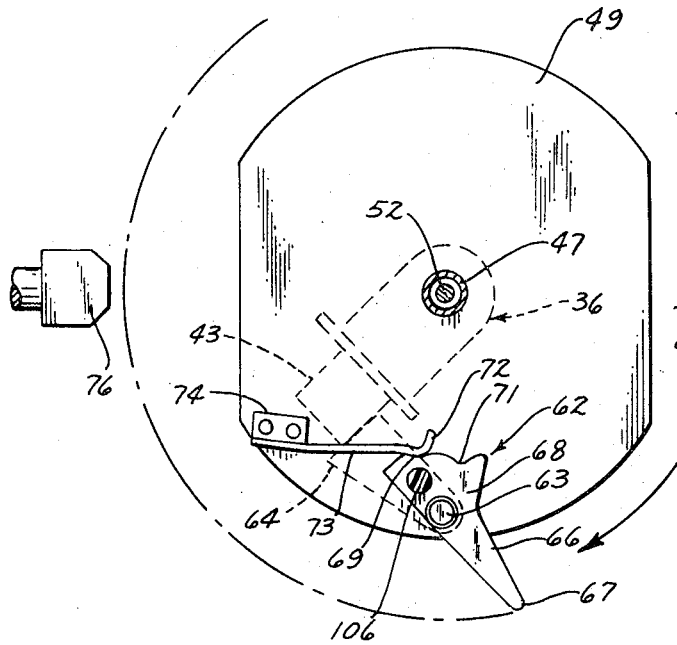
FIG. 6 is a plan view of the assembly shown in FIG. 5 showing the relative positions of the clutch mechanism and an actuating means therefor during a spin welding operation.
Figure 7:
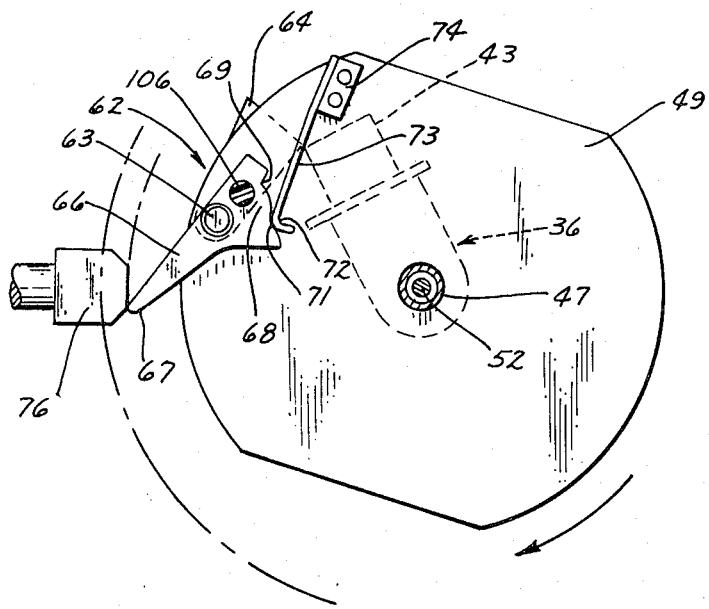
FIG. 7 is illustrated similarly to FIG. 6 and shows the relative positions of the clutch mechanism and the actuating means therefor on completion of a spin welding operation.

This inward movement of the reset pin 106 provides for the concurrent movement of the pawl 64 and trip lever 66 from their rest or inoperative positions shown in FIG. 7, to their operating positions shown in FIG. 6 wherein the pawl 64 is engageable with the elbow fitting 36 and the trip lever 66 is engageable with the actuating member 76. The clutch mechanism 62 is thus automatically reset as it is elevated to the dotted line position in FIG. 2. Thus on positioning of a next housing 29 within the fixture 28 and placement of an elbow fitting 36 therein it is only necessary to reset the timer unit 82 and close the switch 91 to commence another spin welding operation.

Although the invention has been described with respect to a preferred embodiment thereof it is not to be so limited since changes can be made therein which are within the full intended scope of the invention as defined by the appended claims.

I claim:

1. A spin welding machine for welding a plastic elbow fitting in a predetermined relation with a plastic body member having an annular portion connectible with an annular portion at one end of said elbow fitting comprising:
   (a) a drive member,
   (b) means supporting said drive member for axial and rotatable movement,
   (c) a stationary supporting frame,
   (d) means for holding said body member in a predetermined fixed position on said stationary frame with the annular portion thereof faced outwardly and in coaxial alignment with said drive member, said elbow fitting having the annular portion thereof receivable in the annular portion of the body member with the other end portion thereof extended radially of said annular portions,
   (e) means rotatably supported on said drive member and engageable with said elbow fitting, on axial movement of the drive member toward said stationary frame, to maintain the annular portion of the elbow fitting in contact pressure engagement with the annular portion of the body member,
   (f) means movably supported on said drive member for movement relative thereto into and out of a position for engaging the radially extended end portion of the elbow fitting during rotation of said drive member,
   (g) means providing for the rotation of said fitting by said drive member for a predetermined time period in pressure contact engagement with said body member, and
   (h) means on said stationary frame, oriented relative to said body member, for engaging and moving said movable means out of engagement with the elbow fitting on termination of said time period to provide for said radially extended end portion of the elbow fitting being in a predetermined assembly relation with said body member.

2. The spin welding machine according to claim 1, including:
   (a) coacting means on the supporting means for said drive member and on said movable means for resetting the movable means into position for engaging the elbow fitting in response to axial movement of the drive member in a direction away from said stationary frame.

3. A spin welding machine for welding a plastic elbow fitting in a predetermined relation with a plastic housing member having an annular portion connectible with an annular portion at one end of said elbow fitting comprising:
   (a) an axially movable and rotatable drive member,
   (b) a clutch mechanism mounted on said drive member for movement therewith including a radially extended support member, (c) a stationary frame support, (d) means for releasably mounting the housing member on said stationary support against rotation, with the annular portion of the housing member in coaxial alignment with said drive member and facing said drive member to receive the annular portion at said one end of the elbow fitting, (e) means on said support member engageable with the elbow fitting, on axial movement of the drive member in one direction, to maintain the annular portion of the elbow fitting in pressure contact with the annular portion of the housing member, (f) a pawl pivotally mounted on the support member for pivotal movement into and out of engagement with the other end of the elbow fitting during rotational movement of the clutch mechanism, (g) a trip lever pivotally mounted on said support member, (h) means interconnecting said pawl and trip lever for pivotal movement together, and (i) means on stationary frame support for actuating said trip lever to pivotally move said pawl member out of engagement with said other end of the elbow fitting following a predetermined time period of rotational movement of the elbow fitting relative to the housing member, said actuating means being oriented relative to the housing member so that the said other end of the elbow fitting on disengagement with said pawl is in a predetermined rotated position on the housing member.

4. The spin welding machine according to claim 3, wherein:

(a) said actuating means comprises a solenoid unit having an actuator member extendable into an engageable position with said trip lever during rotation of said clutch mechanism by the drive member, and (b) a timer unit on said stationary frame support electrically connected with said solenoid unit to provide for the operation of said actuator member following said predetermined time period of rotational movement.

5. The spin welding machine according to claim 3, having:

(a) means including a reset member on said trip lever for moving said pawl into a position for engaging the elbow fitting in response to axial movement of the drive member in an opposite direction.

References Cited

UNITED STATES PATENTS

| | | | |
|---|---|---|---|
| 2,933,428 | 4/1960 | Mueller | 156—73 |
| 3,235,158 | 2/1966 | Hollander | 29—470.3X |
| 3,316,135 | 4/1967 | Brown et al. | 156—580X |

BENJAMIN A. BORCHELT, Primary Examiner

J. J. DEVITT, Assistant Examiner

U.S. Cl. X.R.

156—73; 228—1; 29—470.3